(12) United States Patent
Huang

(10) Patent No.: US 11,604,660 B2
(45) Date of Patent: *Mar. 14, 2023

(54) METHOD FOR LAUNCHING APPLICATION, STORAGE MEDIUM, AND TERMINAL

(71) Applicant: Guangdong Oppo Mobile Telecommunications Corp., Ltd., Guangdong (CN)

(72) Inventor: Su Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 915 days.

This patent is subject to a terminal disclaimer.

(21) Appl. No.: 16/398,837

(22) Filed: Apr. 30, 2019

(65) Prior Publication Data

US 2019/0354384 A1    Nov. 21, 2019

(30) Foreign Application Priority Data

May 15, 2018 (CN) .......................... 201810463427.3

(51) Int. Cl.
*G06F 9/445* (2018.01)
*G06F 9/451* (2018.01)
(Continued)

(52) U.S. Cl.
CPC .......... *G06F 9/44573* (2013.01); *G06F 9/451* (2018.02); *G06F 9/542* (2013.01); *G06F 3/04817* (2013.01)

(58) Field of Classification Search
CPC ...... G06F 9/44573; G06F 9/451; G06F 9/542; G06F 3/04817; G06N 3/0445
See application file for complete search history.

(56) References Cited

U.S. PATENT DOCUMENTS 7,747,749 B1    6/2010  Erikson et al.
8,812,658 B1    8/2014  Teeraparpwong et al.
(Continued)

FOREIGN PATENT DOCUMENTS

CN    102446096 A    5/2012
CN    102541602 A    7/2012
(Continued)

OTHER PUBLICATIONS

Android Tutorial, "Smoother loading of items," Jun. 12, 2018, Available http://web.archive.org/web/20180612150340/https://riptutorial.com/android/example/3155/smoother-loading-of-items (Year: 2018).*

(Continued)

*Primary Examiner* — Alvin H Tan
(74) *Attorney, Agent, or Firm* — Young Basile Hanlon & MacFarlane, P.C.

(57) ABSTRACT

A method for launching an application, a storage medium, and a terminal are provided. The method includes the following. An application to be preloaded is determined in response to an event of application preloading being triggered. Resources for launching the application to be preloaded are preloaded. The application to be preloaded includes a target application, the resources includes a first resource for launching the target application, and the first resource includes network data of the target application, which is dynamically updated on a network side. In response to receiving an instruction indicative of launching the target application, the target application is launched based on latest network data of the target application and the first resources preloaded.

20 Claims, 7 Drawing Sheets

(51) Int. Cl.
   *G06F 9/54*      (2006.01)
   *G06F 3/04817*   (2022.01)

(56) References Cited

U.S. PATENT DOCUMENTS

| | | | |
|---|---|---|---|
| 9,189,252 B2* | 11/2015 | Chu | G06F 9/451 |
| 9,448,708 B1 | 9/2016 | Bennett et al. | |
| 9,513,888 B1 | 12/2016 | Fultz et al. | |
| 9,557,889 B2 | 1/2017 | Raleigh et al. | |
| 9,565,233 B1 | 2/2017 | Ozuysal et al. | |
| 9,588,897 B2 | 3/2017 | Clausen et al. | |
| 10,261,672 B1* | 4/2019 | Dolbakian | G06F 3/04817 |
| 10,261,938 B1 | 4/2019 | Jenkins et al. | |
| 10,459,887 B1 | 10/2019 | Dvortsov et al. | |
| 10,901,779 B2* | 1/2021 | Wen | G06F 9/485 |
| 10,936,340 B2* | 3/2021 | Lee | G06F 3/0488 |
| 2003/0220984 A1 | 11/2003 | Jones et al. | |
| 2004/0030882 A1 | 2/2004 | Forman | |
| 2004/0153445 A1 | 8/2004 | Horvitz et al. | |
| 2005/0160352 A1 | 7/2005 | Chung et al. | |
| 2005/0204198 A1 | 9/2005 | Pagan | |
| 2007/0016480 A1 | 1/2007 | Lee | |
| 2008/0005736 A1 | 1/2008 | Apacible et al. | |
| 2009/0144396 A1 | 6/2009 | Walton | |
| 2011/0090234 A1 | 4/2011 | Bolcsfoldi et al. | |
| 2011/0292060 A1 | 12/2011 | Chambers et al. | |
| 2011/0295830 A1 | 12/2011 | Swahn | |
| 2012/0023226 A1 | 1/2012 | Petersen et al. | |
| 2012/0105363 A1 | 5/2012 | Sirpal et al. | |
| 2012/0117495 A1 | 5/2012 | Sirpal et al. | |
| 2012/0167122 A1 | 6/2012 | Koskimies | |
| 2012/0324481 A1 | 12/2012 | Xia et al. | |
| 2013/0076597 A1 | 3/2013 | Becze | |
| 2013/0120294 A1 | 5/2013 | Sun et al. | |
| 2013/0173513 A1 | 7/2013 | Chu et al. | |
| 2014/0075377 A1 | 3/2014 | Kang et al. | |
| 2014/0101611 A1* | 4/2014 | Lang | H04L 67/22 709/204 |
| 2014/0173354 A1 | 6/2014 | Stanquist et al. | |
| 2014/0184471 A1 | 7/2014 | Martynov et al. | |
| 2014/0372356 A1 | 12/2014 | Bilal et al. | |
| 2014/0373032 A1 | 12/2014 | Merry et al. | |
| 2015/0026415 A1 | 1/2015 | Clausen et al. | |
| 2015/0293701 A1 | 10/2015 | Kim et al. | |
| 2015/0324137 A1 | 11/2015 | Wu et al. | |
| 2015/0355795 A1 | 12/2015 | Falkenburg et al. | |
| 2016/0117716 A1 | 4/2016 | Lin et al. | |
| 2016/0132344 A1 | 5/2016 | Funk et al. | |
| 2016/0162148 A1 | 6/2016 | Murphy et al. | |
| 2016/0189049 A1 | 6/2016 | Silvestri et al. | |
| 2016/0203021 A1 | 7/2016 | Pike et al. | |
| 2016/0246484 A1 | 8/2016 | Kim et al. | |
| 2016/0357572 A1 | 12/2016 | Myrick et al. | |
| 2016/0360336 A1 | 12/2016 | Gross et al. | |
| 2016/0364272 A1 | 12/2016 | Hou et al. | |
| 2017/0031690 A1 | 2/2017 | Ren | |
| 2017/0046171 A1 | 2/2017 | Jung et al. | |
| 2017/0185250 A1 | 6/2017 | Cho et al. | |
| 2017/0195451 A1 | 7/2017 | Backholm | |
| 2017/0344783 A1 | 11/2017 | Zhang et al. | |
| 2018/0089105 A1 | 3/2018 | Bain et al. | |
| 2018/0097905 A1 | 4/2018 | Todasco et al. | |
| 2018/0217853 A1 | 8/2018 | Li et al. | |
| 2018/0246635 A1 | 8/2018 | Baer et al. | |
| 2018/0293087 A1 | 10/2018 | Lee et al. | |
| 2019/0018565 A1 | 1/2019 | Lee et al. | |
| 2019/0065240 A1 | 2/2019 | Kong et al. | |
| 2019/0303176 A1 | 10/2019 | John | |
| 2019/0342298 A1 | 11/2019 | Chen et al. | |
| 2019/0361581 A1 | 11/2019 | Wang et al. | |
| 2020/0401418 A1 | 12/2020 | Regev et al. | |

FOREIGN PATENT DOCUMENTS

| | | |
|---|---|---|
| CN | 102819436 A | 12/2012 |
| CN | 102929532 A | 2/2013 |
| CN | 103092687 A | 5/2013 |
| CN | 103106000 A | 5/2013 |
| CN | 103246529 A | 8/2013 |
| CN | 103376974 A | 10/2013 |
| CN | 103412757 A | 11/2013 |
| CN | 103581754 A | 2/2014 |
| CN | 103593479 A | 2/2014 |
| CN | 103631612 A | 3/2014 |
| CN | 103677922 A | 3/2014 |
| CN | 104092821 A | 10/2014 |
| CN | 104298554 A | 1/2015 |
| CN | 104657183 A | 5/2015 |
| CN | 104809174 A | 7/2015 |
| CN | 104850799 A | 8/2015 |
| CN | 104951340 A | 9/2015 |
| CN | 105426214 A | 3/2016 |
| CN | 105431822 A | 3/2016 |
| CN | 105657522 A | 6/2016 |
| CN | 105682037 A | 6/2016 |
| CN | 105786839 A | 7/2016 |
| CN | 105824657 A | 8/2016 |
| CN | 105912215 A | 8/2016 |
| CN | 105912227 A | 8/2016 |
| CN | 105939416 A | 9/2016 |
| CN | 105955765 A | 9/2016 |
| CN | 106055369 A | 10/2016 |
| CN | 106056010 A | 10/2016 |
| CN | 106066805 A | 11/2016 |
| CN | 106201241 A | 12/2016 |
| CN | 106250988 A | 12/2016 |
| CN | 106325913 A | 1/2017 |
| CN | 106406966 A | 2/2017 |
| CN | 106569894 A | 4/2017 |
| CN | 106648733 A | 5/2017 |
| CN | 106648747 A | 5/2017 |
| CN | 106685851 A | 5/2017 |
| CN | 106775820 A | 5/2017 |
| CN | 106778248 A | 5/2017 |
| CN | 106874091 A | 6/2017 |
| CN | 106874095 A | 6/2017 |
| CN | 106919313 A | 7/2017 |
| CN | 106941672 A | 7/2017 |
| CN | 106959879 A | 7/2017 |
| CN | 107229397 A | 10/2017 |
| CN | 107249074 A | 10/2017 |
| CN | 107273011 A | 10/2017 |
| CN | 107368361 A | 11/2017 |
| CN | 107508961 A | 12/2017 |
| CN | 107562495 A | 1/2018 |
| CN | 107678799 A | 2/2018 |
| CN | 107678803 A | 2/2018 |
| CN | 107678823 A | 2/2018 |
| CN | 107728874 A | 2/2018 |
| CN | 107729133 A | 2/2018 |
| CN | 107748685 A | 3/2018 |
| CN | 107748686 A | 3/2018 |
| CN | 107766201 A | 3/2018 |
| CN | 107783801 A | 3/2018 |
| CN | 107833073 A | 3/2018 |
| CN | 107872523 A | 4/2018 |
| CN | 107885591 A | 4/2018 |
| CN | 107943650 A | 4/2018 |
| CN | 107944259 A | 4/2018 |
| CN | 108076224 A | 5/2018 |
| CN | 108572965 A | 9/2018 |
| CN | 108595224 A | 9/2018 |
| CN | 108595227 A | 9/2018 |
| CN | 108595228 A | 9/2018 |
| CN | 108595231 A | 9/2018 |
| CN | 108614722 A | 10/2018 |
| CN | 108647052 A | 10/2018 |
| CN | 108647056 A | 10/2018 |
| CN | 108762831 A | 11/2018 |
| CN | 108762843 A | 11/2018 |
| CN | 108804157 A | 11/2018 |

(56) References Cited

FOREIGN PATENT DOCUMENTS

| | | |
|---|---|---|
| CN | 108829456 A | 11/2018 |
| CN | 108829457 A | 11/2018 |
| CN | 108920156 A | 11/2018 |
| EP | 1242880 A2 | 9/2002 |
| EP | 3486769 A1 | 5/2019 |
| WO | 03054696 A1 | 7/2003 |
| WO | 2013073908 A1 | 5/2013 |
| WO | 2015169188 A1 | 11/2015 |
| WO | 2017057912 A1 | 4/2017 |
| WO | 2018055506 A1 | 3/2018 |
| WO | 2018161812 A1 | 9/2018 |
| WO | 2019171237 A1 | 9/2019 |

OTHER PUBLICATIONS

International search report issued in corresponding international application No. PCT/CN2019/084999 dated Jul. 25, 2019.
Extended European search report issued in corresponding European application No. 19173437.5 dated Oct. 14, 2019.
Abhinav Parate et al: "Practical prediction and prefetch for faster access to applications on mobile phones", Proceedings of the 2013 ACM International Joint Conference on Pervasive and Ubiquitous Computing, UBICOMP '13, Sep. 8, 2013 (Sep. 8, 2013), p. 275, XP055336968, New York, New York, USA DOI: 10.1145/2493432. 2493490 ISBN: 978-1-4503-1770-2 the whole document.
Indian Examination Report for IN Application 201914018342 dated May 12, 2021. (6 pages).
Examination report issued in corresponding European application No. 19173437.5 dated Nov. 2, 2020.
International Search Report for International Application PCT/CN2019/083256 dated Jun. 14, 2019. (11 pages).
China First Office Action with English Translation for CN Application 201810578120.8 dated Nov. 30, 2020. (19 pages).
Extended European Search Report for EP Application 19176708.6 dated Nov. 5, 2019. (8 pages).
European Examination Report for EP Application 19176708.6 dated Jun. 23, 2020. (5 pages).
India Examination Report for IN Application No. 201914022209 dated Sep. 30, 2020. (6 pages).
International Search Report for International Application PCT/CN2019/089685 dated Aug. 28, 2019. (10 pages).
China First Office Action with English Translation for CN Application No. 201810400917.9 dated Aug. 28, 2019. (29 pages).
China Second Office Action with English Translation for CN Application 201810400917.9 dated Nov. 7, 2019. (28 pages).
China Third Office Action with English Translation for CN Application 201810400917.9 dated Jan. 17, 2020. (32 pages).
Chinese Decision to Refuse with English Translation for CN Application 201810400917.9 dated Apr. 20, 2020. (47 pages).
International Search Report for International Application PCT/CN2019/084218 dated Jul. 31, 2019. (17 pages).
China First Office Action with English Translation for CN Application No. 201810531573.5 dated Oct. 29, 2020. (18 pages).
European Partial Search Report for EP Application 19173778.2 dated Oct. 11, 2019. (15 pages).
Google, Multi-Window Support—Android Developers. (7 pages).
Extended European Search Report for EP Application 19173778.2 dated Jan. 29, 2020. (14 pages).
India Examination Report for IN Application 201914018510 dated Jan. 27, 2021. (5 pages).
U.S. Non Final Office Action for U.S. Appl. No. 16/394,768 dated Feb. 19, 2021. (41 pages).
International Search Report for International Application PCT/CN2019/083479 dated Jun. 27, 2019. (10 pages).
Extended European Search Report for EP Application 19793314.6 dated Apr. 20, 2021. (9 pages).
Android Developer, Handle Activity State Changes, Nov. 7-8, 2018. (35 pages).
US Third Party Submission for U.S. Appl. No. 16/290,190 mailed May 27, 2020. (21 pages).
Notice of Allowance for U.S. Appl. No. 16/397,521 dated Apr. 15, 2021. (12 pages).
Extended European Search Report for EP Application 18212560.9 dated May 23, 2019. (9 pages).
China First Office Action with English Translation for CN Application 201711340000.6 dated Nov. 29, 2019. (11 pages).
China Second Office Action with English Translation for CN Application 201711340000.6 dated Mar. 25, 2020. (20 pages).
China Third Office Action with English Translation for CN Application 201711340000.6 dated Jul. 7, 2020. (18 pages).
Chinese Decision to Refuse with English Translation for CN Application 201711340000.6 dated Nov. 4, 2020. (14 pages).
India First Examination Report for IN Application 201814047359 dated Mar. 22, 2021. (7 pages).
U.S. Non-Final Office Action for U.S. Appl. No. 16/220,601 dated Jul. 8, 2020. (38 pages).
U.S. Final Office Action for U.S. Appl. No. 16/220,601 dated Jan. 19, 2021. (26 pages).
International Search Report for International Application PCT/CN2018/121309 dated Mar. 14, 2019. (11 pages).
University of Zhejiang, Behavioral Pattern Mining for Mobile Applications, Chapter 3. (11 pages).
China First Office Action with English Translation for CN Application 201810530136.1 dated Mar. 20, 2020. (29 pages).
China Second Office Action with English Translation for CN Application 201810530136.1 dated Sep. 30, 2020. (21 pages).
China Third Office Action with English Translation for CN Application 201810530136.1 dated Apr. 2, 2021. (21 pages).
Extended European Search Report for EP Application 19169146.8 dated Nov. 12, 2019. (8 pages).
India Office Action for IN Application 201914014288 dated Mar. 22, 2021. (7 pages).
International Search Report for International Application PCT/CN2019/082303 dated Jul. 12, 2019. (10 pages).
China First Office Action with English Translation for CN Application 201810532749.9 dated Mar. 2, 2020. (15 pages).
Tingxin Yan et al., Fast App Launching for Mobile Devices Using Predictive User Context, Mobisys 12, Jun. 25-29, 2012. (14 pages).
Extended European Search Report for EP Application 19162115.0 dated Sep. 27, 2019. (10 pages).
International Search Report for International Application PCT/CN2019/076755 dated May 10, 2019. (10 pages).
China First Office Action with English Translation for CN Application 201810532722.X dated Sep. 23, 2019. (11 pages).
China Notice of Allowance with English Translation for CN Application 201810532722.X dated Mar. 25, 2020. (12 pages).
Ricardo Baeza-Yates et al., Predicting the Next App That You Are Going to Use, WSDM'15, Feb. 2-6, 2015. (11 pages).
Extended European Search Report EP Application 19168847.2 dated Oct. 23, 2019. (8 pages).
Indian Examination Report for IN Application 201914019649 dated Nov. 27, 2020. (6 pages).
U.S. Non-final Office Action for U.S. Appl. No. 16/290,190 dated Mar. 5, 2020. (37 pages).
International Search Report for International Application PCT/CN2019/085900 dated Aug. 1, 2019. (10 pages).
China Office Action with English Translation for CN Application 201810443981.5 dated Feb. 10, 2020. (16 pages).
China Second Office Action with English Translation for CN Application 201810443981.5 dated Aug. 3, 2020. (16 pages).
Neural network for time series forecasting. (6 pages).
China Third Office Action with English Translation for CN Application 201810443981.5 dated Nov. 16, 2020. (18 pages).
Extended European Search Report for EP Application 19173310.4 dated Oct. 11, 2019. (8 pages).
India Examination Report for IN Application 201914018092 dated Feb. 8, 2021. (5 pages).
International Search Report for International Application PCT/CN2019/085347 dated Aug. 12, 2019. (10 pages).
China First Office Action with English Translation for CN Application 201810443194.0 dated Dec. 11, 2019. (15 pages).

(56) References Cited

OTHER PUBLICATIONS

China Second Office Action with English Translation for CN Application 201810443194.0 dated Mar. 25, 2020. (18 pages).
China Decision to Refuse with English Translation for CN Application 201810443194.0 dated Jul. 9, 2020. (12 pages).
Hong Cao et al., Mining smartphone data for app usage prediction and recommendations: A survey. Pervasive and Mobile Computing, Elsevier, vol. 37, Jan. 20, 2017. (1-22 pages).
Extended European Search Report for EP Application 19171005.2 dated Oct. 10, 2019. (10 pages).
European Examination Report for EP Application 19171005.2 dated Aug. 28, 2020. (5 pages).
European Examination Report for EP Application 19171005.2 dated Mar. 24, 2021. (6 pages).
India Examination Report for IN Application 201914016637 dated Feb. 8, 2021. (7 pages).
International Search Report for International Application PCT/CN2019/083230 dated Jun. 17, 2019. (11 pages).
China First Office Action with English Translation for CN Application 201810442588.4 dated Mar. 29, 2019. (25 pages).
China Second Office Action with English Translation for CN Application 201810442588.4 dated Oct. 15, 2019. (18 pages).
China Third Office Action with English Translation for CN Application 201810442588.4 dated May 18, 2020. (15 pages).
Extended European Search Report for EP Application 19171253.8 dated Sep. 30, 2019. (7 pages).
India Examination Report for IN Application 201914017025 dated Jan. 27, 2021. (7 pages).
US Third Party Submission for U.S. Appl. No. 16/397,521 mailed May 11, 2020. (15 pages).
U.S. Non-final Office Action for U.S. Appl. No. 16/397,521 dated Feb. 16, 2021. (36 pages).

* cited by examiner

METHOD FOR LAUNCHING APPLICATION, STORAGE MEDIUM, AND TERMINAL

CROSS-REFERENCE TO RELATED APPLICATIONS

This application claims priority to Chinese Patent Application No. 201810463427.3, filed on May 15, 2018, the disclosure of which is hereby incorporated by reference in its entirety.

TECHNICAL FIELD

The present disclosure relates to the technical field of preloading an application, and more particularly to a method for launching an application, a storage medium, and a terminal.

BACKGROUND

At present, terminals such as smart phones, tablets, notebook computers, and smart television have become indispensable electronic devices in people's daily life.

Various applications (APP) can be installed in smart terminals to meet different needs of users. As the functions of the applications become increasingly diversified, an increasing number of resources need to be loaded when the applications are running. When a user chooses to launch an application, the terminal will load the resources required for the application to be launched. After the loading is completed, the terminal enters an initial interface of the application. The whole process usually takes several seconds or even more than ten seconds, which results in low launching efficiency and thus needs to be improved.

SUMMARY

Embodiments of present disclosure provide a method for launching an application, a storage medium, and a terminal.

In a first aspect, embodiments of the present disclosure provide a method for launching an application. The method includes the following.

An application to be preloaded is determined in response to an event of application preloading being triggered. Resources for launching the application to be preloaded are preloaded. The application to be preloaded includes a target application, the resources includes a first resource for launching the target application, and the first resource includes network data of the target application, which is dynamically updated on a network side. In response to receiving an instruction indicative of launching the target application, the target application is launched based on latest network data of the target application and the first resources preloaded.

In a second aspect, a non-transitory computer-readable storage medium is provided according to the embodiments of the present disclosure. The computer-readable storage medium is configured to store computer programs which, when executed by a processor, are operable with the processor to execute the method for launching an application in the first aspect of the present disclosure.

In a third aspect, a terminal is provided according to the embodiments of the present disclosure. The terminal includes at least one processor and a computer readable storage coupled to the at least one processor and storing at least one computer executable instruction thereon which, when executed by the at least one processor, cause the at least one processor to execute the method for launching an application in the first aspect of the present disclosure when executed by the processor.

DETAILED DESCRIPTION

Technical solutions of the present disclosure will be further described below through embodiments with reference to the accompanying drawings. It will be appreciated that the embodiments described herein are merely for the purpose of explanation rather than restriction of the disclosure. In addition, for the convenience of description, only some structures related to the present disclosure, rather than all structures, are illustrated in the accompanying drawings.

Before discussing the exemplary embodiments in more detail, it should be noted that some exemplary embodiments are described as processes or methods illustrated in a flowchart. In the flowchart, although each step is depicted as being processed sequentially, some of these steps can be performed in parallel, concurrently, or simultaneously. In addition, the order of the steps can be rearranged. The process of one step can be terminated when a corresponding operation is completed, but the embodiments can also have additional steps that are not illustrated in the accompanying drawings. The process can correspond to a method, a function, a procedure, a subroutine, a subprogram, and the like.

Figure 1:
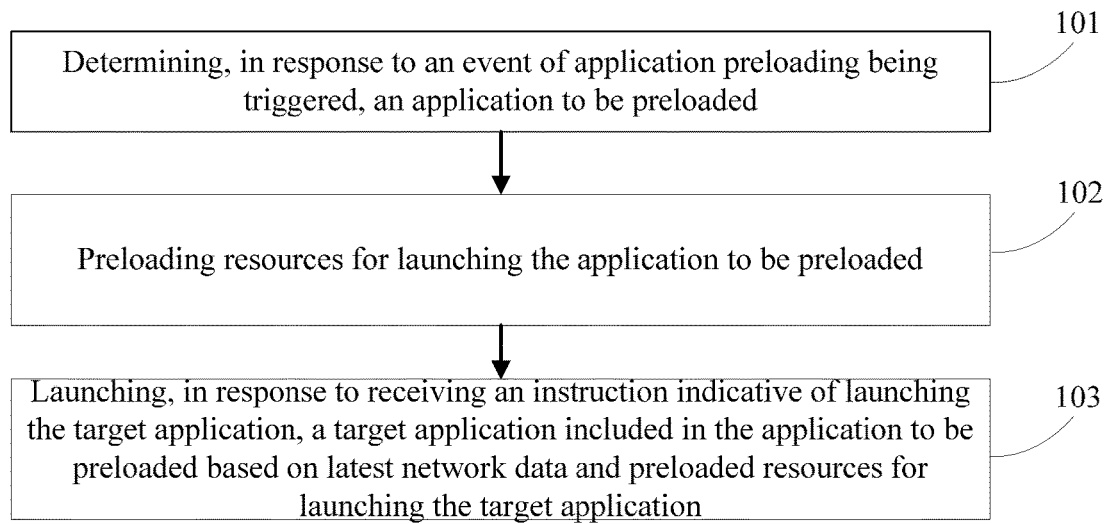
FIG. 1 is a flowchart illustrating a method for launching an application according to an embodiment of the present disclosure.

FIG. 1 is a flowchart illustrating a method for launching an application according to an embodiment of the present disclosure. The method can be implemented by an apparatus for launching an application. The apparatus can be implemented by software and/or hardware, and can be generally integrated into a terminal. As illustrated in FIG. 1, the method includes the following.

At 101, an application to be preloaded is determined in response to an event of application preloading being triggered.

As an embodiment, the terminal provided herein can be a terminal device such as a mobile phone, a tablet computer, a notebook computer, a smart household appliance, and the like. The terminal is loaded with an operating system.

As an embodiment, a triggering condition of the event of application preloading can be set based on practical situations, which is not limited herein. As an embodiment, the event of application preloading can be triggered in response to detecting that a user operation satisfies a preset condition (such as taking up the terminal, inputting to unlock a screen or the terminal, and the like). As another embodiment, the event of application preloading can be triggered in response to detecting a change of a foreground application. For yet another embodiment, the event of application preloading can be triggered immediately (or after a preset duration) after a process for predicting the application to be preloaded is completed. As an embodiment, the event of application preloading can be triggered periodically. When the event of application preloading is triggered, the operating system can detect that the event of application preloading is triggered by reading a flag, receiving a trigger instruction, or the like. The manner of detection is not limited herein.

As an embodiment, the application to be preloaded can be understood as an application that may be launched soon by a user, a fixed application specified in advance, an application that is predicted in a certain manner, or the like. There can be one or more applications to be preloaded. The one or more applications can be determined as the application to be preloaded.

As an embodiment, the application to be preloaded can be predicted by adopting a prediction model. The prediction model can be a machine-learning model. An algorithm adopted can include recurrent neural networks (RNN), long short-term memory (LSTM) networks, gated recurrent unit (GRU), simple recurrent unit (SRU), auto encoder, decision tree, random forest, feature mean classification, classification and regression tree, hidden Markov model, K-nearest neighbor (KNN) algorithm, logistic regression model, Bayesian model, Gaussian model, Kullback-Leibler (KL) divergence, and the like.

As an embodiment, training samples can be collected during use of the terminal, a preset initial model can be trained by using the training samples, and finally the prediction model for predicting the application to be preloaded is obtained. As an embodiment, elements contained in the training samples can include a time sequence or an order in which applications are launched and include time, locations, frequencies, and the like at which applications are launched. The elements can include running status of the terminal, such as an on/off state of a mobile data network, a connected/disconnected state of a wireless hotspot, identity information of a connected wireless hotspot, an application currently running, a previous foreground application, a duration for which a current application stays in the background, a time point at which the current application was last switched to the background, a plugging/unplugging state of an earphone jack, a charging state, power information of a battery, a display duration of a screen, and the like. The elements can also include data collected by a sensor integrated in the terminal, such as a motion sensor, a light sensor, a temperature sensor, a humidity sensor, and the like.

As an embodiment, proper sample elements can be selected based on the machine-learning model selected. As another embodiment, the machine-learning model also can be determined based on the selected sample elements. As yet another embodiment, both the machine-learning model and the sample elements can be selected based on requirements for prediction accuracy and prediction speed, which is not limited herein.

In embodiments of the present disclosure, the application to be preloaded can be determined based on a previous output result of the prediction model. As another embodiment, by adopting the prediction model for prediction, the application to be preloaded can be determined based on a current output result of the prediction model.

In embodiments of the present disclosure, when there are multiple (that is, N) applications to be preloaded, the prediction model can output launching probabilities of each of a set of candidate applications, and candidate applications with higher launching probabilities are determined as the applications to be preloaded. As an embodiment, the application to be preloaded can be determined as follows. Launching probabilities of candidate applications are predicted. A preset number of candidate applications with higher startup probabilities are determined as the application(s) to be preloaded. As an embodiment, the candidate applications can include all or part of applications installed in the terminal. The part of applications may not include system applications, and may not include applications that are rarely used. The determining manner and the quantity of the candidate applications are not limited in the embodiments of the present disclosure. As an embodiment, the candidate applications can be determined based on the frequency of use (the number of time of use) and/or duration of use of each application within a preset time period before current moment. The preset time period can be, for example, one month. When the frequency of use and/or the duration of use of an application exceed a corresponding threshold, the application is determined as a candidate application. As another embodiment, all applications are sorted in a descending order of the frequency of use and/or the duration of use, and top-ranked applications are determined as candidate applications.

As an embodiment, the launching probability of each candidate application can be determined by the above-mentioned prediction model. Current samples are collected according the training samples used for training the prediction model, and the current samples are input into the prediction model to obtain the launching probability of each candidate application. All the candidate applications are sorted in a descending order of launching probabilities, and N (N is a preset number) top-ranked candidate applications are determined as the application(s) to be preloaded. In this way, multiple applications can be preloaded, and the multiple applications are determined based on the launching probabilities, which can improve accuracy of prediction.

At 102, resources for launching the application to be preloaded are preloaded.

The application to be preloaded includes a target application, the resources for launching the application to be preloaded include a resource for launching the target application (the resource for launching the target application can also be named as a first resource for launching the target application), and the first resource includes network data of the target application, which is dynamically updated on the network side.

In the embodiments of the present disclosure, when there is only one application to be preloaded, there is no need to consider the preloading order of the application. When there are multiple applications to be preloaded, the multiple applications to be preloaded can be determined as a current application to be preloaded one by one and preloaded in turn. It is also possible to determine two or more applications to be preloaded as current applications to be preloaded, and preload the two or more applications simultaneously, that is, preloading processes of the multiple applications can be conducted in parallel.

In the embodiments of the present disclosure, the resources for launching to be preloaded are not limited herein. As an embodiment, corresponding hardware resources can be allocated to the application to be preloaded, and related data required for launching can be loaded based on the allocated hardware resources. As an embodiment, application process launching, application service launching, memory allocation, file content reading, network data acquisition, and the like can be included. In addition, the specific preloading process is also not limited herein. Besides, the resources to be preloaded can be determined based on a specific type of the application to be preloaded.

At 103, in response to receiving an instruction indicative of launching a target application included in the application to be preloaded, the target application is launched based on latest network data and preloaded resources for launching the target application.

Resources for launching the target application include network data of the target application dynamically updated on a network side. The preloaded resources for launching the target application include preloaded network data of the target application.

In the embodiment of the present disclosure, the resources for launching the target application include network data of the target application dynamically updated on the network side, in other words, the network data included in the resources for launching the target application is updated in real time on the network side. When detecting that the event of application preloading is triggered, the application to be preloaded is determined and the resources for launching the application to be preloaded are preloaded. When receiving the instruction indicative of launching the target application included in the application to be preloaded, if the target application is launched directly based on preloaded resources for launching the target application, it may cause that the target application fails to be launched based on resources for launching including latest network data, and the latest network data cannot be displayed and provided to the user timely when the target application is launched, which will cause poor timeliness of launching content of the target application. As an embodiment, when an application running in the foreground currently is switched to Application A, the application to be preloaded predicted includes Application B, Application C, and Application D, and resources for launching corresponding to Application B, Application C, and Application D are preloaded respectively. Application A is running in the foreground currently, and an instruction indicative of launching Application C is received after one hour. Resources for launching Application C include network data of Application C dynamically updated on the network side. When Application C is launched directly based on preloaded resources for launching, the timeliness of launching content of Application C cannot be ensured.

As an embodiment, the target application may include at least one of a news application, a map application, a video application, a shopping application, a music application, and a browser application. As an embodiment, the news application, such as Application A, will provide the latest events to users as quickly as possible, with different events happening all the time. The news application focuses on the timeliness of news. Generally, important news or headlines are displayed in a launching interface of a corresponding application to catch user's eyes. If the latest news cannot be provided quickly to the user when such a news application is launched, the user experience is likely to be poor. As another embodiment, a music application, such as Application B, will provide the most popular music or a newly released music highly concerned to users at full speed. Typically, the latest music or today's recommended music is displayed in a launching interface of an application for users to click to listen to. It will lead to poor user experience if the latest music or today's recommended music cannot be quickly provided to the user when such a music application is launched.

Therefore, in response to receiving the instruction indicative of launching the target application included in the application to be preloaded, the target application is launched based on the latest network data and the preloaded resources for launching the target application, to ensure the timeliness of the launching content of the target application. As an embodiment, in response to receiving the instruction indicative of launching the target application, the latest network data of the target application is acquired. Preloaded resources for launching the target application are updated based on the latest network data. The target application is launched based on the updated resources for launching the target application. As another embodiment, after the resources for launching the application to be preloaded are preloaded and before receiving the instruction indicative of launching the target application included in the application to be preloaded, as for an application included, of which resources for launching include network data dynamically updated on the network side, in the application to be preloaded, update the resources for launching the application based on the latest network data, thereby ensuring that the resources for launching the target application include the latest network data when receiving the instruction indicative of launching the target application and launching the target application based on preloaded resources for launching the target application.

As an embodiment, the instruction indicative of launching the target application in the application to be preloaded is received as one of the following. An invoking instruction indicative of invoking the target application by another application is detected; the instruction indicative of launching the target application is determined to be received by receiving a press on a desktop icon of the target application. The another application can be understood as an application other than the target application in the terminal. As an embodiment, the another application is an application currently running in the foreground, such as Application A. In the process of Application A being used, the target application, such as Application B, included in the application to be preloaded needs to be invoked, which means that the instruction indicative of launching the target application is detected. As an embodiment, in the process of Application C (Application C can be an instant messaging application) being used, a news message shared by a friend is received, the news message is clicked and opened, and at this time, the instruction indicative of launching Application D is detected. Application D corresponding to the news message belongs to the application to be preloaded and network data of included in the resources for launching Application D is dynamically updated on the network side. Application D can be launched based on corresponding latest network data and preloaded resources for launching, so as to facilitate the user to exit the news message and the latest headlines to be provided to the user when the main interface of Application D is entered. As another embodiment, when the user searches for a nearby hotel with Application E (Application E can be a shopping application) and a driving route from the user's current location to a hotel, and the user is accustomed to using Application F (Application F can be a map application), a map interface in Application E is necessary to be switched to Application F. At this time, an instruction indicative of launching Application F is detected. When Application F belongs to the application to be preloaded and network data included in the resources for launching Application F is dynamically updated on the network side, Application F can be launched based on corresponding latest network data and preloaded resources for launching, so that the current location of the user can be located accurately and an accurate driving route can be provided.

Of course, when receiving a press on a desktop icon of the target application included in the application to be preloaded, for example, when the user presses the desktop icon of the target application and raises the finger, it is determined that the instruction indicative of launching the target application is received.

According to the method for launching an application provided in the embodiments of the present disclosure, the application to be preloaded is determined in response to the event of application preloading being triggered. The resources for launching the application to be preloaded are preloaded. In response to receiving the instruction indicative of launching the target application included in the application to be preloaded, the target application is launched based on the latest network data and the preloaded resources for launching the target application, the resources for launching the target application including the network data of the target application dynamically updated on the network side. By adopting the technical solution described above, when network data included in resources for launching an application is dynamically updated on the network side, the launching speed of the application can be improved, while the timeliness of launching content of the application can be ensured when the application is lunched on a terminal side, on the basis of preloading the resources for launching the predicted application that would be launched by the user.

As an embodiment, in response to receiving the instruction indicative of launching the target application included in the application to be preloaded, the target application is launched based on the latest network data and the preloaded resources for launching the target application as following. In response to receiving the instruction indicative of launching the target application, the latest network data of the target application included in the application to be preloaded is acquired. The target application is launched based on the preloaded resources for launching and the latest network data of the target application. In this way, the timeliness of launching content can be ensured when the target application to be preloaded is lunched on the terminal side and the update of network data included in the resources for launching other applications in the application to be preloaded can be avoided, so that system resources can be effectively saved. The other applications in the application to be preloaded refer to a non-target application, especially an application the network data included in the resources for launching which is dynamically updated on the network side.

In the embodiments of the present disclosure, when receiving the instruction indicative of launching the target application in the application to be preloaded, that is, when receiving an instruction indicative of launching an application in the application to be preloaded and the resources for launching the application include network data dynamically updated on the network side, the latest network data of the target application is acquired, and the target application is launched based on the preloaded resources for launching and the latest network data of the target application acquired. As an embodiment, network data included in the preloaded resources for launching the target application is updated with the latest network data of the target application acquired. The target application is launched based on updated resources for launching. As an embodiment, when receiving the instruction indicative of launching the target application, the latest network data of the target application is compared with the network data included in preloaded resources for launching. When the latest network data of the target application is different from the network data included in preloaded resources for launching, the target application is launched based on the latest network data acquired and the preloaded resources for launching; when the latest network data of the target application is the same with the network data included in preloaded resources, the target application is directly launched based on the preloaded resources for launching.

As an embodiment, the application to be preloaded includes an application of a predetermined type, the target application belongs to the application of the predetermined type, the resources for launching the application to be preloaded include a resource for launching the application of the predetermined type (the resource for launching the application of the predetermined type can also be named as a second resource for launching the application of the predetermined type), the second resource includes network data of the application of the predetermined type, which is dynamically updated on the network side, the second resource includes the first resource. In response to receiving the instruction indicative of launching the target application included in the application to be preloaded, the target application is launched based on the latest network data and the preloaded resources for launching the target application as following. When the application to be preloaded includes an application of a predetermined type, latest network data of the application of the predetermined type is acquired. Resources for launching the application of the predetermined type include network data of the application of the predetermined type dynamically updated on the network side. Preloaded resources for launching the application of the predetermined type are updated based on the latest network data of the application of the predetermined type. In response to receiving the instruction indicative of launching the target application included in the application to be preloaded, the target application included in the application to be preloaded is launched based on preloaded resources for launching updated of the target application. The target application belongs to the application of the predetermined type. In this way, when receiving the instruction indicative of launching the target application, the network data included in the preloaded resources for launching the target application is the latest network data can be ensured. The timeliness of launching content of the target application to be launched can be ensured when the target application is lunched on the terminal side, while the launching speed of the target application can be improved.

In the embodiments of the present disclosure, it is determined whether the application to be preloaded includes the application of the predetermined type. The resources for launching the application of the predetermined type include network data of the application of the predetermined type dynamically updated on the network side, that is, the network data included in the resources for launching the application of the predetermined type are dynamically updated on the network side. As an embodiment, the application of the predetermined type can include at least one kind of a news application, a map application, a video application, a shopping application, a music application, and a browser application. When the application to be preloaded includes the application of the predetermined type, the latest network data of the application of the predetermined type is acquired. Preloaded resources for launching the application of the predetermined type are updated based on the latest network data included in the resources for launching acquired, so as to ensure the timeliness of the resources for launching the application of the predetermined type included in the application to be preloaded. When receiving the instruction indicative of launching the target application, the target application is launched based on preloaded resources for launching updated of the target application. The target application belongs to the application of the predetermined type, that is, the network data included in the resources for launching the target application is dynamically updated on the network side.

As an embodiment, when the application to be preloaded includes the application of the predetermined type, the latest network data of the application of the predetermined type is acquired as following. When the application to be preloaded includes the application of the predetermined type, latest network data of the application of the predetermined type is acquired every preset time period. In other words, the resources for launching the application of the predetermined type are updated every preset time period, which can effectively reduce the amount of the data processing of the terminal and ensure the smooth running of the application running in the foreground. As an embodiment, when the application to be preloaded includes the application of the predetermined type, the latest network data of the application of the predetermined type is acquired in real time, that is, it is determined in real time that whether the network data in the resources for launching the application of the predetermined type is the latest. If not, the resources for launching the application of the predetermined type is updated based on the latest network data.

As an embodiment, the method further includes the following before the instruction indicative of launching the target application included in the application to be preloaded is received. An application interface of the application to be preloaded is preloaded based on a pre-established active-window stack for preloading. Boundary coordinates of the active-window stack for preloading are out (that is, located beyond) a coordinate range of a display screen. As such, by preloading the application interface, preparation work before the application is launched can be completed mostly and the launching speed of the application to be preloaded is improved, without affecting the display of display content of a foreground application on the display screen.

In the embodiments of the present disclosure, an active-window can be understood as a separate interface that provides interaction and operation directly to the user. In different operating systems the interface can be referred to as different terms. To facilitate understanding, Android® operating system is taken as an example in the following.

In Android® system, the active-window is named "Activity". The Activity is a component responsible for interacting with the user. The Activity provides a screen (which can be understood as a screen interface rather than a physical display screen) for the user to interact with to complete a certain task. In an Android® application, an Activity is usually a separate screen on which some controls can be displayed, and the separate screen can also monitor and handle events of the user. In the management of the Activity, there are two concepts: Task (task stack) and Stack (active-window stack). The Task corresponds to an application and is configured to store the Activity. One or more Activities can be stored in one Task, and these Activities follow a principle of "first in, last out; last in, first out". However, the Stack is configured to manage the Task. In general, one Stack manages Tasks to which each Activity to be displayed on a screen belongs, and one Stack can manage one or more Tasks. The Stack also follows basic management principles of stacks. The screen described herein is not necessarily a complete and separate display screen. Taking "two screens" as an example, the two screens can be just two areas that independently display their respective contents on a complete display screen. The "two screens" can also be two separate display screens when the terminal has two or even more than two separate display screens.

In Android® system, a multi-window mode is supported, and the multi-window mode can include a split-screen mode, a picture-in-picture mode, and a free mode (that is, FreeForm). In the multi-window mode, the Stack on which the application locates can have its own size and can include a top coordinate, a bottom coordinate, a left coordinate, and a right coordinate in a coordinate system with the top left corner of the terminal screen as the origin. For example, boundaries of a rectangle are generally described by (a, b, c, d) and can be represented by coordinates of the top left corner and coordinates of the bottom right corner of the rectangle. The coordinates of the top left corner are (a, b) and the coordinates of the bottom right corner are (c, d). Such a rectangular area then corresponds to the size of the Stack. An in-application layout in the Stack is based on the size of the Stack, that is, the application interface corresponding to the Activity is displayed within the bounds of the size.

In the multi-window mode, multiple applications can be allowed to be visible (to both the system and the user or to the system only). When an application is visible to both the system and the user, it means that the application is displayed on the display screen and the user can see it. When an application is visible to the system only, it means that the application is only visible to the operating system and invisible to the user, and the application may be occluded by a foreground application, or displayed outside the display screen as implemented in the embodiments of the present disclosure.

In the embodiments of the present disclosure, the application interfaces of the application to be preloaded can be preloaded outside the display screen based on a multi-window mechanism of the operating system. With the multi-window mechanism, the size corresponding to the application can be set outside the display screen to achieve the purpose of invisibility to the user, whereby display content of the foreground application on the display screen will not be affected.

In the multi-window mode, there can be multiple types of Stacks, such as Home Stack, APP Stack, other split-screen Stacks, and the like. The Home Stack represents a stack for display of desktop applications. The App Stack represents a stack for display of third-party applications. In the embodiments of the present disclosure, a preloading active-window stack (that is, preloading Stack) is added to represent a stack for display of a preloaded application. The boundary coordinates of the preloading Stack are set beyond the coordinate range of the display screen, and the application to be preloaded can be displayed on the Stack. For Android® system, a new Stack dedicated to displaying preloaded applications can be established based on the multi-window mechanism of Android® system. In the embodiments of the present disclosure, the reason for which the new Stack is established is that the new preloading Stack established can have its own size and visibility, thus achieving the purpose of preloading outside the display screen.

In the embodiments of the present disclosure, the time for establishing the preloading Stack is not limited. The preloading Stack can be set to be resident by default before the terminal is shipped, that is, the preloading Stack always exists. The preloading Stack can also be established after the terminal is turned on or unlocked. As another embodiment, the preloading Stack can be established after the event of application preloading is triggered (before the application to be preloaded is determined), and the like. As an embodiment, the application interface of the application to be preloaded is preloaded based on the pre-established preloading active-window stack as follows. Whether the pre-established preloading active-window stack exists is determined. When the pre-established preloading active-window stack is absent, a preloading active-window stack is established based on a predetermined principle. The application interface of the application to be preloaded is preloaded based on the preloading active-window stack established. In this way, whether the preloading Stack exists is determined after the application to be preloaded is determined. If so, it is unnecessary to establish a new stack, and if not, the preloading Stack is established, so that system resources can be saved. As an embodiment, when there are multiple applications to be preloaded, that is, when multiple applications to be preloaded need to be preloaded continuously in a short time period, since the preloading stack is established before a first application to be preloaded starts to be preloaded, the preloading stack still exists before a second application to be preloaded starts to be preloaded, and it is not necessary to determine as above before the second application to be preloaded starts to be preloaded.

In the embodiments of the present disclosure, the process for preloading the application interface of the application to be preloaded based on the preloading Stack is not limited. For example, the application interface can be drawn and displayed based on a size of the preloading Stack.

In some embodiments, the application interface of the application to be preloaded is preloaded based on the pre-established preloading active-window stack as follows. A target process corresponding to the application to be preloaded is established. A task stack (Task) corresponding to the application to be preloaded is established in the pre-established preloading active-window stack. An active-window corresponding to the application to be preloaded is launched in the task stack based on the target process. The application interface of the application to be preloaded is drawn and displayed based on the active-window launched. As such, it is possible to draw and display the application interface of the application to be preloaded based on the preloading active-window stack that is out the coordinate range of the display screen, without interfering with running and display of the foreground application, so as to ensure system stability and, meanwhile, effectively increase the speed of launching the application to be preloaded. While the target process is established, an initiation procedure of the target process can be included. During execution of the foregoing operations, preloading of other resources can also be involved, such as application service launching, memory allocation, file content reading, network data acquisition, and the like. Preloading procedures of other resources are not limited in the embodiments of the present disclosure.

In some embodiments, the method further includes the following. A notification for forging a focus is sent to the application to be preloaded, and continuous drawing and updated display of the application interface of the application to be preloaded are maintained during a preset time period based on the notification for forging a focus. In this way, it is possible to finish drawing and display of the application interface with the application to be preloaded obtaining the focus and being visible to the system, and to improve completeness of preloading, without interfering with a focus of the foreground application. The focus described herein is also referred to as an input focus. A forged focus is independent from the focus of the foreground application. Generally, for the current Android® system, the focus is unique. For instance, an input operation such as touching is only effective for the focus. As to input focus information, the system end is accordant with the application end, and once the system end modifies the input focus information, information indicative of modification of the input focus information will be sent to the application end, so as to keep the input focus information in the system end in accordance with that in the application end. In the embodiments of the disclosure, by separating the input focus information of the system end and the input focus information of the application end, the purpose of forging the focus in the application end is achieved. In the embodiments of the present disclosure, while the notification for forging a focus is applied to the application to be preloaded to make the application to be preloaded have focus information, focus information of the system end is still correct. As such, the application to be preloaded can be drawn normally and hence be preloaded completely. The focus exists in the system end and the application end, which can be considered as existing in a server and a client. The system end records the application with the focus and the application end saves the flag to identify whether it has the focus. The input focus can be forged when a window system of Android® adds a window and needs to update the focus, and then the notification for forging a focus is generated and sent. The focus can be forged by calling the client end of the window to change the focus of the window, whereby the window obtains the focus. As an embodiment, the notification for forging a focus can be sent based on the Binder mechanism. The Binder mechanism is most commonly used for inter-process communication in Android® system, and adopts a c/s architecture, that is, a client/service architecture.

In the embodiments of the present disclosure, the preset time period can be set based on practical situations. For example, the preset period can be a fixed period after preloading is started, a period from start of preloading to completion of preloading, or the like. In some embodiments, duration of the preset period includes play duration of a launched advertisement or a launched animation of the application to be preloaded. During launching some applications, some advertisements or animations may be played and last for three to more than ten seconds. The user may be unable to perform any operation during playing of the advertisements or animations but wait for completion of the playing, which wastes user's valuable time. According to the embodiments of the present disclosure, it is possible to complete the playing of the advertisements or animations outside the screen before the application to be preloaded is launched, so that a homepage or other pages of the application operable with the user can be directly entered when the application to be preloaded is launched. In this way, a time point at which the application to be preloaded is operable can be further advanced, thereby reducing waiting time.

In the embodiments of the present disclosure, the method further includes the following after the instruction indicative of launching the target application is received. An application interface of the target application included in the pre-established active-window stack for preloading is migrated to the display screen for display. As such, when the target application needs to be launched, it is possible to directly migrate (move) the application interface drawn to the display screen for display, which can realize quick switching of application interfaces and increase the launching speed.

In the embodiments of the present disclosure, the application interface of the target application included in the pre-established preloading active-window stack is migrated to the display screen for display as follows. A task stack corresponding to the target application included in the pre-established preloading active-window stack is migrated to the top of an application active-window stack. Size information, configuration information, and visibility of the task stack are updated, such that the application interface of the target application can be displayed on the display screen. In this way, it is possible to ensure stability of migration process of the interface and avoid problems such as lag, black screen, low migration speed, or the like during recovery.

Figure 2:
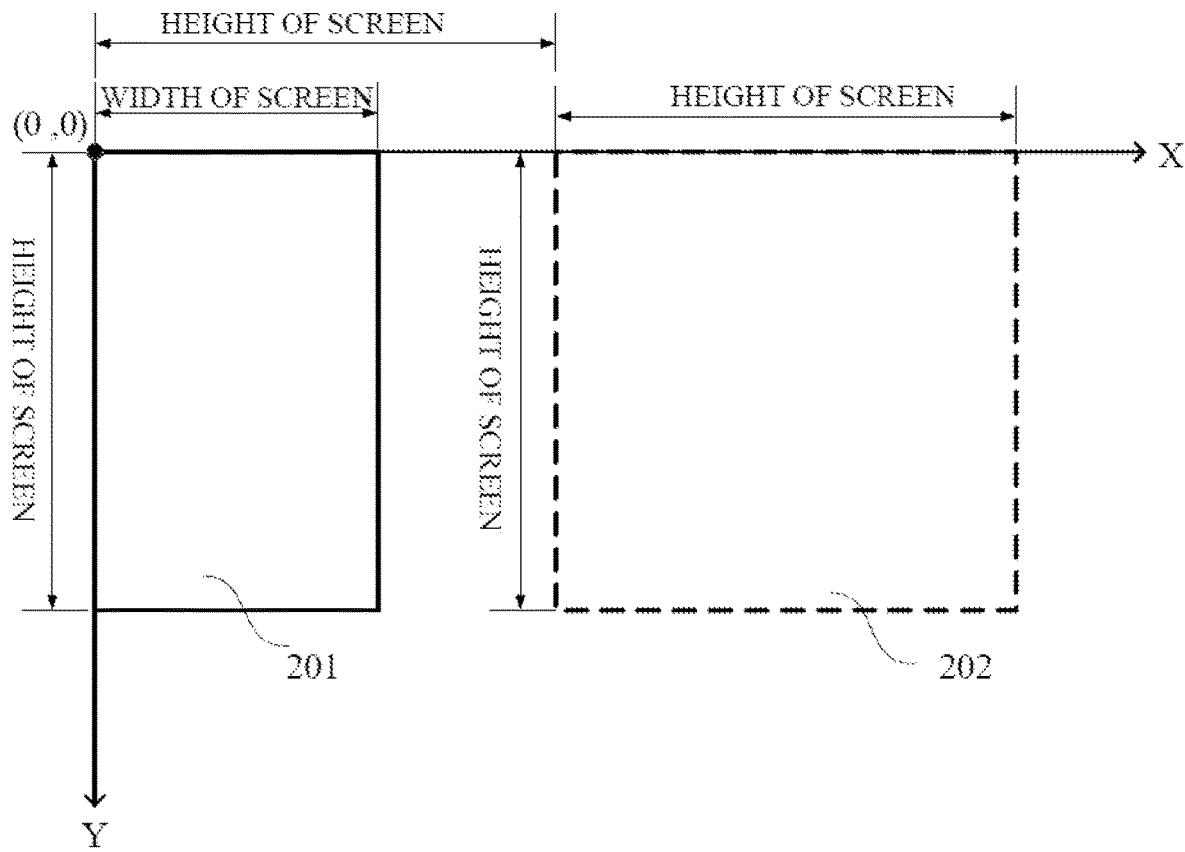
FIG. 2 is a diagram illustrating a relative position relationship between an active-window stack for preloading and a display area of a display screen according to an embodiment of the present disclosure.
Figure 3:
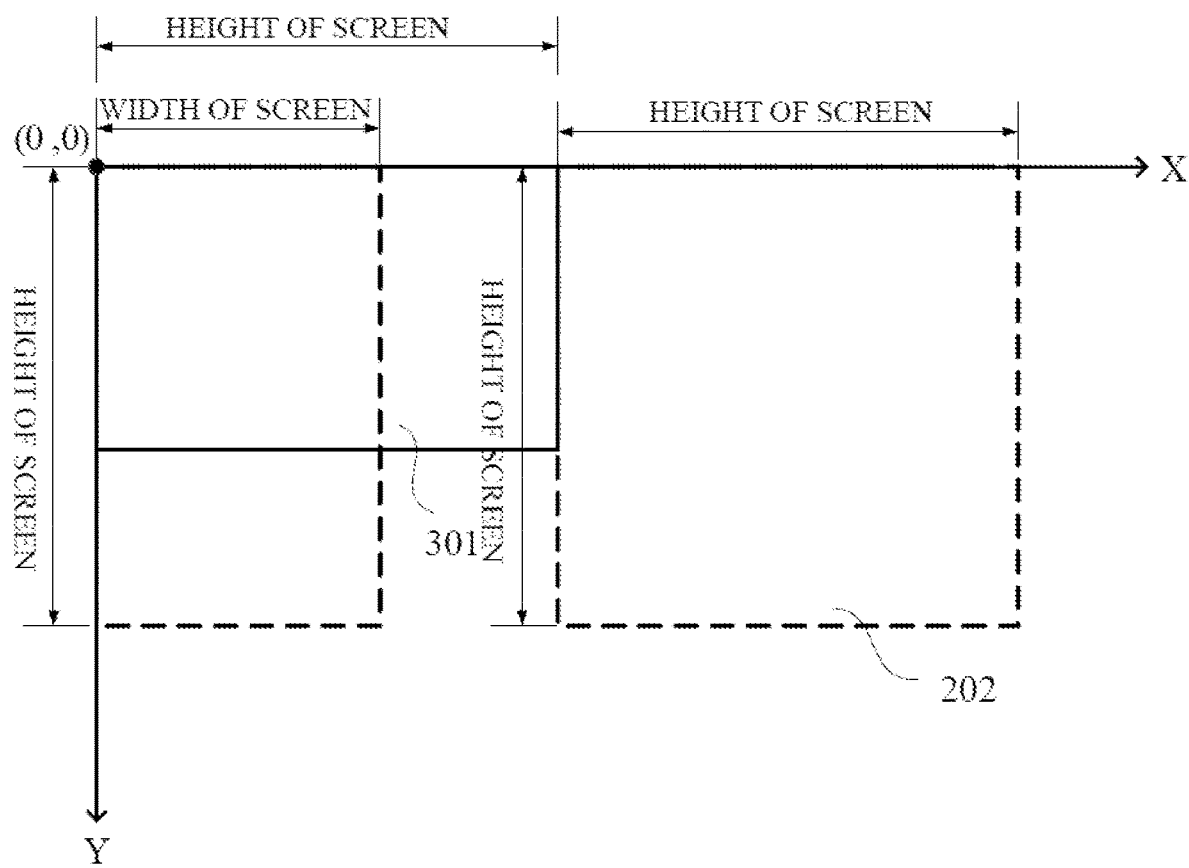
FIG. 3 is a diagram illustrating a relative position relationship between an active-window stack for preloading and a display area of a display screen according to another embodiment of the present disclosure.

For some terminals, particularly for mobile terminals such as mobile phones and tablet computers, display modes of the display screen usually include a landscape mode and a portrait mode for convenience of the user. While lots of applications are displayed in the portrait mode by default, some other applications are displayed in the landscape mode by default (such as some online games). When the terminal is in use, some applications can switch between the landscape mode and the portrait mode, as the user changes a direction of holding the terminal. In some embodiments, the boundary coordinates of the preloading active-window stack are denoted as (H, 0, 2H, H), the coordinate system corresponding to the boundary coordinates is a system coordinate, the system coordinate has an origin located at an upper left corner of the display screen, and H denotes a length of a long side of a display area of the display screen, that is, a side corresponding to H is the longest side of the display area of the display screen, which is the height of the display screen in the portrait mode and the width of the display screen in the landscape mode. In this way, it is possible to take into consideration the landscape mode of the display screen, display of the application preloaded in the landscape mode, and normal display of some applications. FIG. 2 is a diagram illustrating a relative position relationship between a preloading active-window stack and a display area of a display screen according to an embodiment of the present disclosure. As illustrated in FIG. 2, the display screen is in the portrait mode. The origin of the system coordinate of the terminal is located at a left vertex (0, 0) of the display screen 201. The width direction of the display screen 201 is defined as X-axis, and the height direction is defined as Y-axis. The boundary coordinates of the preloading Stack 202 are denoted as (H, 0, 2H, H), where H denotes the height of the screen, that is, an area within the solid rectangle on the left side is the display area of the display screen, and an area within the dotted rectangle on the right side is the preloading display area. FIG. 3 is a diagram illustrating a relative position relationship between a preloading active-window stack and a display area of a display screen according to another embodiment of the present disclosure. As illustrated in FIG. 3, the display screen is in the landscape mode. The origin of the system coordinate of the terminal is located at a left vertex (0, 0) of the display screen 301. The height direction of the display screen 301 is defined as X-axis, and the width direction is the defined as Y-axis. The boundary coordinates of the preloading Stack 202 are denoted as (H, 0, 2H, H), where H denotes the height of the screen, that is, an area within the solid rectangle on the left side is the display region of the display screen, and an area within the dotted rectangle on the right side is the preloading display region.

The reasons for which boundaries of the preloading Stack are set as such are as follows.

A horizontal coordinate of the upper left corner is H, which is to prevent the display screen (also called the main screen) from displaying on the interface of the application to be preloaded when the display screen is in a landscape mode. Since the main screen can be in the landscape mode in addition to the portrait mode, in order to prevent the display area of the main screen from displaying part of the preloaded application when the main screen is in the landscape mode, the horizontal coordinate of the upper left corner of the rectangle area corresponding to the preloading Stack is set to be the height of the main screen.

A vertical coordinate of the upper left corner is 0, which is for the application to be preloaded to calculate correctly a height of a status bar. In order to better design a user interface (UI), the Android® application can customize a top status bar. If the vertical coordinate corresponding to an upper side is not equal to 0, the height of the status bar may be wrong.

A horizontal coordinate of the lower right corner is 2H (twice the height of the screen), that is, a width of a rectangle corresponding to the preloading Stack equals the height of the screen such that the size of the preloading Stack can include a size of a preloaded landscape application (that is, an application with an application interface in the landscape mode).

A vertical coordinate of the lower right corner is H, that is, a height of the rectangle corresponding to the preloading Stack equals the height of the screen so that the size of the preloading Stack can include a size of a preloaded portrait application (that is, an application with an application interface in the portrait mode).

For the reasons above, the size of the preloading Stack is set to be (H, 0, 2H, H).

Figure 4:
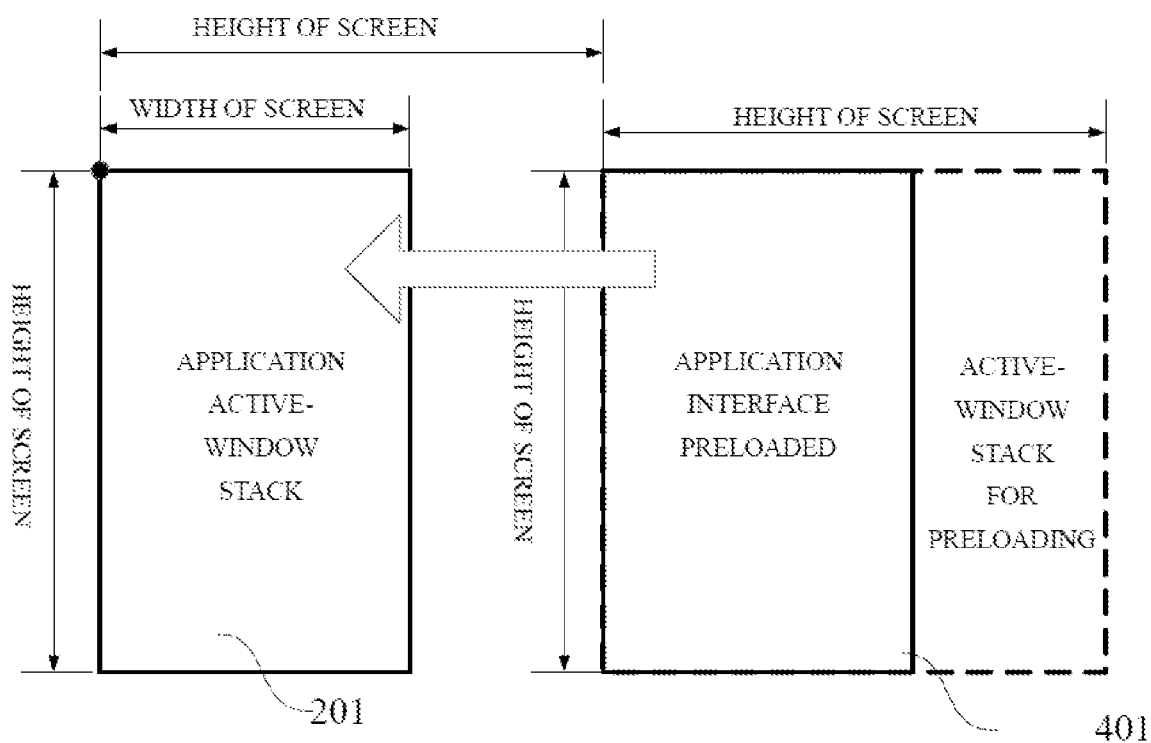
FIG. 4 is a diagram illustrating migration of an application interface according to an embodiment of the present disclosure.

In addition, FIG. 4 is a diagram illustrating migration of an application interface according to an embodiment of the present disclosure. As illustrated in FIG. 4, in response to receiving the instruction indicative of launching the target application, the application interface 401 of the target application included in the pre-established preloading active-window stack is migrated to the display screen 201 for display. In this embodiment, a task to which the interface of the application to be preloaded belongs is migrated to a top of an application active-window stack, and size information, configuration information, and visibility of the task are updated, whereby the application interface can be displayed on the display screen normally.

Figure 5:
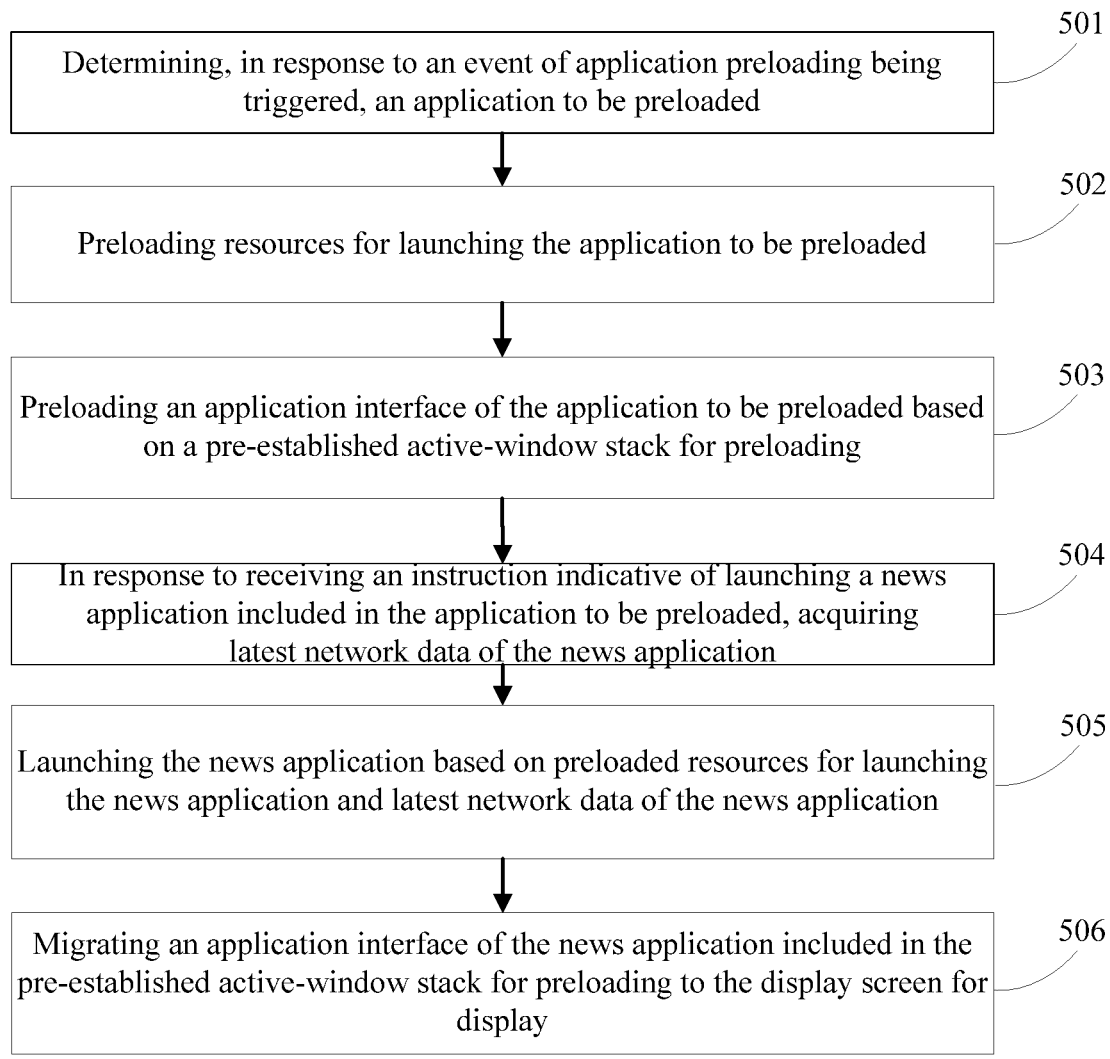
FIG. 5 is a flowchart illustrating a method for launching an application according to another embodiment of the present disclosure.

FIG. 5 is a schematic flowchart illustrating a method for launching an application according to another embodiment of the present disclosure. The method includes the following.

At 501, in response to an event of application preloading being triggered, an application to be preloaded is determined.

The application to be preloaded predicted includes an application of a predetermined type. Resources for launching the application of the predetermined type include network data dynamically updated on the network side. Applications to be predicted include an application network data included in the preloaded resources for launching which is dynamically updated on the network side, such as a news application, a music application, and a calculator application.

At 502, resources for launching the application to be preloaded are preloaded.

At 503, an application interface of the application to be preloaded is preloaded based on a pre-established active-window stack for preloading.

Boundary coordinates of the active-window stack for preloading are out a coordinate range of a display screen.

At 504, in response to receiving an instruction indicative of launching a news application included in the application to be preloaded, latest network data of the news application is acquired.

Resources for launching the news application include network data dynamically updated on the network side.

As an embodiment, resources for launching the news application include network data dynamically updated on the network side, such as headlines or heavy news displayed in a launching interface of the news application.

At 505, the news application is launched based on preloaded resources for launching the news application and latest network data of the news application.

At 506, an application interface of the news application included in the pre-established active-window stack for preloading is migrated to the display screen for display.

According to the method for launching an application provided in the embodiments of the present disclosure, in response to receiving the instruction indicative of launching a news application included in the application to be preloaded, the latest network data of the news application is acquired. The news application is launched based on preloaded resources for launching the news application and latest network data of the news application. In this way, the timeliness of launching content of the news application to be launched can be ensured when the news application is lunched on the terminal side and the update of network data included in the resources for launching other applications in the application to be preloaded can be avoided, so that system resources can be effectively saved. The other applications may refer to a non-news application, especially an application the network data included in the resources for launching which is dynamically updated on the network side.

Figure 6:
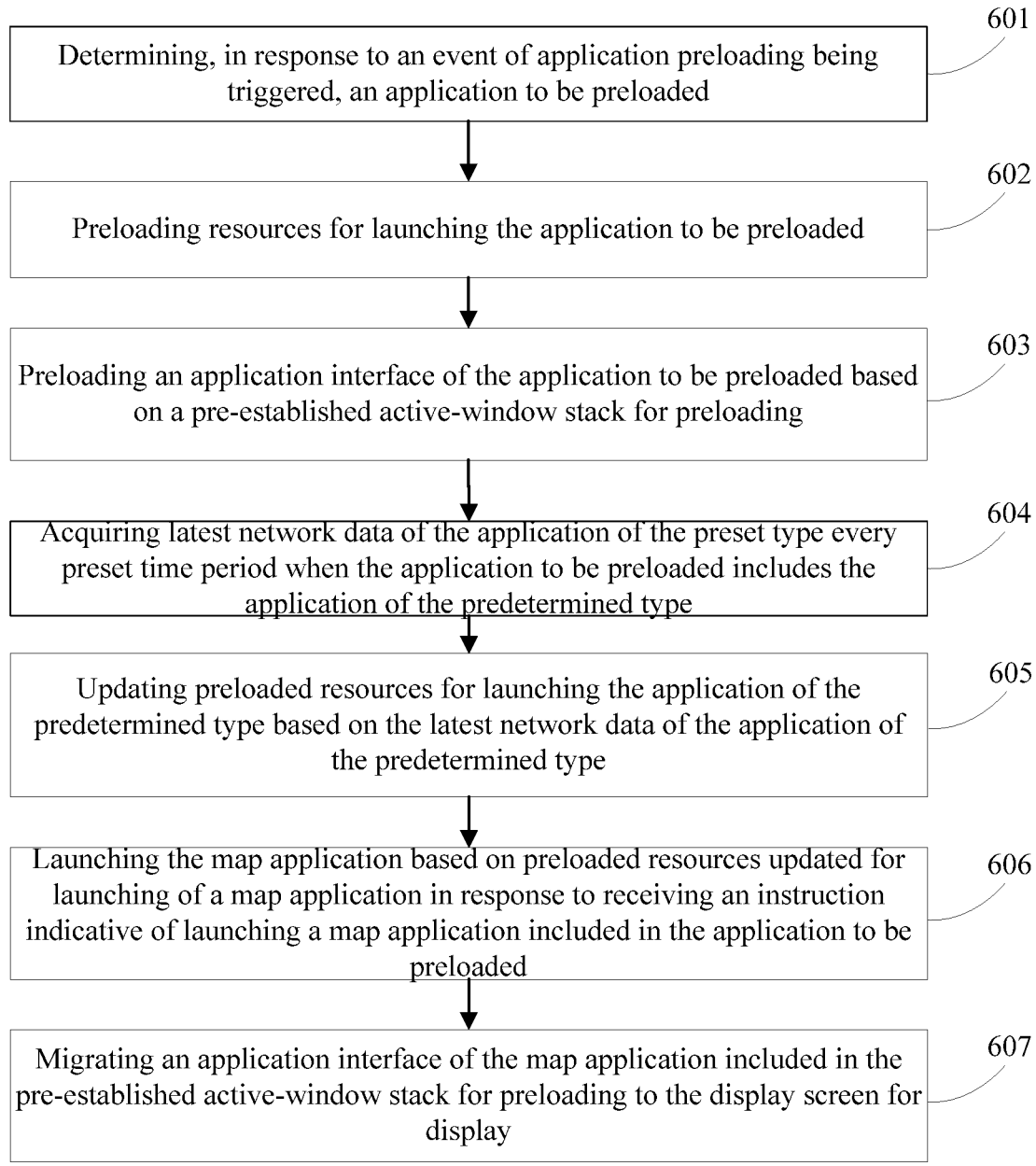
FIG. 6 is a flowchart illustrating a method for launching an application according to yet another embodiment of the present disclosure.

FIG. 6 is a schematic flowchart illustrating a method for launching an application according to another embodiment of the present disclosure. The method includes the following.

At 601, in response to detecting an event of application preloading being triggered, an application to be preloaded is determined.

The application to be preloaded predicted includes an application of a predetermined type. Resources for launching the application of the predetermined type include network data dynamically updated on the network side. Applications to be predicted include an application network data included in the preloaded resources for launching which is dynamically updated on the network side, such as a map application, a browser application, and a calendar application.

At 602, resources for launching the application to be preloaded are preloaded.

At 603, an application interface of the application to be preloaded is preloaded based on a pre-established active-window stack for preloading.

Boundary coordinates of the active-window stack for preloading are out a coordinate range of a display screen.

At 604, when the application to be preloaded includes the application of the predetermined type, latest network data of the application of the predetermined type is acquired every preset time period.

Resources for launching the application of the predetermined type include network data dynamically updated on the network side. As an embodiment, the application of the predetermined type may include a news application, a map application, a video application, a shopping application, a music application, and a browser application.

At 605, preloaded resources for launching the application of the predetermined type are updated based on the latest network data of the application of the predetermined type.

At 606, in response to receiving an instruction indicative of launching a map application included in the application to be preloaded, the map application is launched based on preloaded resources updated for launching a map application.

As an embodiment, resources for launching the application of the map application include network data dynamically updated on the network side, such as a current location of a user and traffic information around the current location displayed in a launching interface of the map application.

At 607, an application interface of the map application included in the pre-established active-window stack for preloading is migrated to the display screen for display.

According to the method for launching an application provided in the embodiments of the present disclosure, when the application to be preloaded includes the application of the predetermined type, the latest network data of the application of the predetermined type is acquired. The resources for launching the application of the predetermined type include network data dynamically updated on the network side. The preloaded resources for launching the application of the predetermined type are updated based on the latest network data of the application of the predetermined type. In response to receiving the instruction indicative of launching a map application included in the application to be preloaded, the map application is launched based on preloaded resources for launching updated of the map application. The map application belongs to the application of the predetermined type. In this way, preloaded resources for launching the map application include the newest network data. The timeliness of launching content of the map application to be launched can be ensured when the map application is lunched on the terminal side and the launching speed of the map application can be further improved. In addition, while preloading the resources for launching the application to be preloaded, the application interface of the application to be preloaded is preloaded beyond the coordinate range of the display screen. In this way, in response to receiving the instruction indicative of launching the map application, a preloaded interface can be displayed directly, thereby improving the launching speed of the map application.

Figure 7:
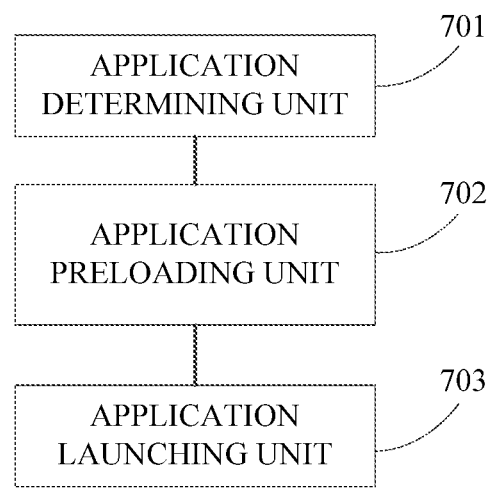
FIG. 7 is a block diagram illustrating an apparatus for launching an application according to an embodiment of the present disclosure.

FIG. 7 is a block diagram illustrating an apparatus for launching an application according to an embodiment of the present disclosure. The apparatus can be implemented with software and/or hardware and can be generally integrated in a terminal. The apparatus can launch an application by executing the method for launching an application. As illustrated in FIG. 7, the apparatus includes an application determining unit 701, an application preloading unit 702, and an application launching unit 703.

The application determining unit 701 is configured to determine an application to be preloaded in response to an event of application preloading being triggered.

The application preloading unit 702 is configured to preload resources for launching the application to be preloaded.

The application launching unit 703 is configured to launch a target application included in the application to be preloaded based on latest network data and preloaded resources for launching the target application, in response to receiving an instruction indicative of launching the target application, resources for launching the target application include network data dynamically updated on a network side.

According to the apparatus for launching an application provided in the embodiments of the present disclosure, the application to be preloaded is determined in response to the event of application preloading being triggered. The resources for launching the application to be preloaded are preloaded. In response to receiving the instruction indicative of launching the target application included in the application to be preloaded, the target application is launched based on the latest network data and the preloaded resources for launching the target application, the resources for launching the target application include the network data of the target application dynamically updated on the network side. By adopting the technical solution described above, when network data included in resources for launching an application is dynamically updated on the network side, the launching speed of the application can be improved, while the timeliness of launching content of the application can be ensured when the application is lunched on a terminal side, on the basis of preloading the resources for launching the predicted application that would be launched by a user.

As an embodiment, the application launching unit 703 is configured to acquire the latest network data of the target application included in the application to be preloaded in response to receiving the instruction indicative of launching the target application; launch the target application based on the preloaded resources for launching and the latest network data of the target application.

As an embodiment, the application launching unit 703 includes a network data acquiring sub-unit, a preloaded resources updating unit, and an application launching sub-unit.

The network data acquiring sub-unit is configured to acquire latest network data of an application of a predetermined type when the application to be preloaded includes the application of the predetermined type. Resources for launching the application of the predetermined type include network data of the application of the predetermined type dynamically updated on the network side.

The preloaded resources updating sub-unit is configured to update preloaded resources for launching the application of the predetermined type based on the latest network data of the application of the predetermined type.

The application launching sub-unit is configured to launch the target application included in the application to be preloaded based on preloaded resources for launching updated of the target application, in response to receiving the instruction indicative of launching the target application. The target application belongs to the application of the predetermined type.

As an embodiment, the network data acquiring sub-unit is configured to acquire latest network data of the application of the predetermined type every preset time period when the application to be preloaded includes the application of the predetermined type.

As an embodiment, the instruction indicative of launching the target application is received as one of the following.

An invoking instruction indicative of invoking the target application included in the application to be preloaded by another application is detected; the instruction indicative of launching the target application is determined to be received by a press on a desktop icon of the target application included in the application to be preloaded being received.

As an embodiment, the apparatus further includes an application interface preloading unit.

The application interface preloading unit is configured to preload an application interface of the application to be preloaded based on a pre-established active-window stack for preloading, boundary coordinates of the active-window stack for preloading being out a coordinate range of a display screen.

As an embodiment, the apparatus further includes an application interface migrating unit.

The application interface migrating unit is configured to migrate an application interface of the target application included in the pre-established active-window stack for preloading to the display screen for display.

In the embodiments of the present disclosure, the units or sub-units can refer an application-specific integrated circuit (ASIC), a processor, a memory configured to implement one or more software or hardware programs, a integrated logical circuit, and/or other devices that can provide above functions. In addition, the above units or sub-units can be implemented via the processor of terminal device illustrated in FIG. 8.

The embodiments of the disclosure also provide a non-transitory computer-readable storage medium which includes computer executable instructions. The computer executable instructions are configured to execute a method for launching an application when executed by a computer processor. The method includes the following.

An application to be preloaded is determined in response to an event of application preloading being triggered. Resources for launching the application to be preloaded are preloaded. In response to receiving an instruction indicative of launching a target application included in the application to be preloaded, the target application is launched based on latest network data and preloaded resources for launching the target application. Resources for launching the target application include network data of the target application dynamically updated on a network side.

The storage medium refers to any of various types of memory devices or storage devices. The term "storage medium" is intended to include: a mounting medium such as a compact disc read-only memory (CD-ROM), a floppy disk, or a tape device; a computer system memory or a random access memory such as a dynamic random access memory (DRAM), a double data rate random access memory (DDRRAM), a static random access memory (SRAM), an extended data output random access memory (EDORAM) and a Rambus random access memory (Rambus RAM); a non-transitory memory such as a flash memory and a magnetic medium (such as a hard disk or an optical memory); a register and other similar types of memory elements, and the like. The storage medium can also include other types of memory or a combination thereof. In addition, the storage medium can be located in a first computer system in which a program is executed, or can be located in a second computer system coupled to the first computer system via a network, such as the Internet. The second computer system can provide program instructions to the first computer for execution. The term "storage medium" can include two or more storage media that can reside in different locations (e.g. different computer systems connected through a network). The storage medium can store program instructions which are, for example, implemented as computer programs and are executable by one or more processors.

The computer executable instructions included in the storage medium provided herein are not limited to executing the operations of preloading an application as described above, and can also execute relevant operations of the method for launching an application according to any of the embodiments of the disclosure.

Figure 8:
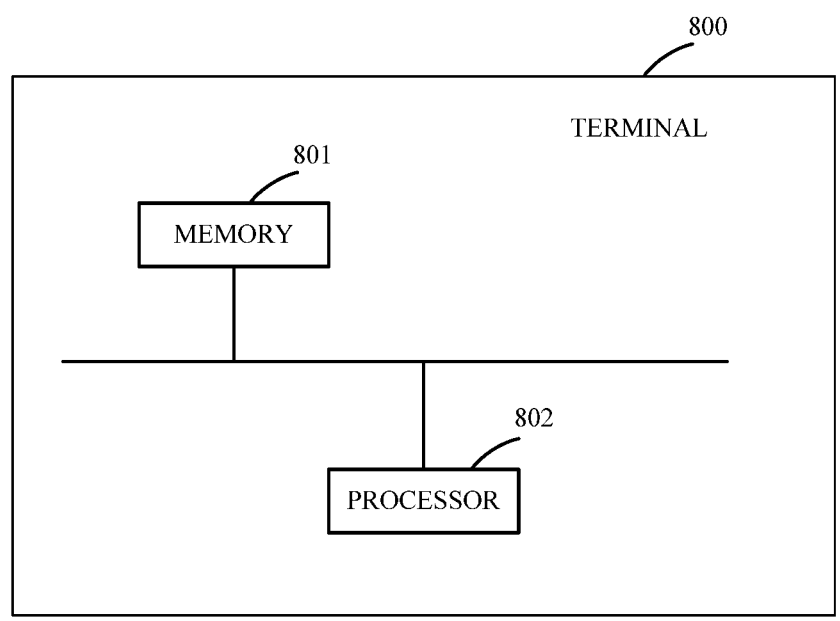
FIG. 8 is a block diagram illustrating a terminal according to an embodiment of the present disclosure.

Embodiments of the disclosure provide a terminal, into which the apparatus for launching an application provided herein can be integrated. FIG. 8 is a schematic structural diagram illustrating a terminal according to an embodiment of the disclosure. The terminal 800 includes a memory 801, a processor 802, and computer programs stored in the memory 801 and executed by the processor 802. The processor 802 is configured to execute the computer programs to execute the method for launching an application of the embodiments of the disclosure.

According to the terminal provided herein, when network data included in resources for launching an application is dynamically updated on the network side, the launching speed of the application can be improved, while the timeliness of launching content of the application can be ensured when the application is lunched on a terminal side, on the basis of preloading the resources for launching the predicted application that would be launched by a user.

Figure 9:
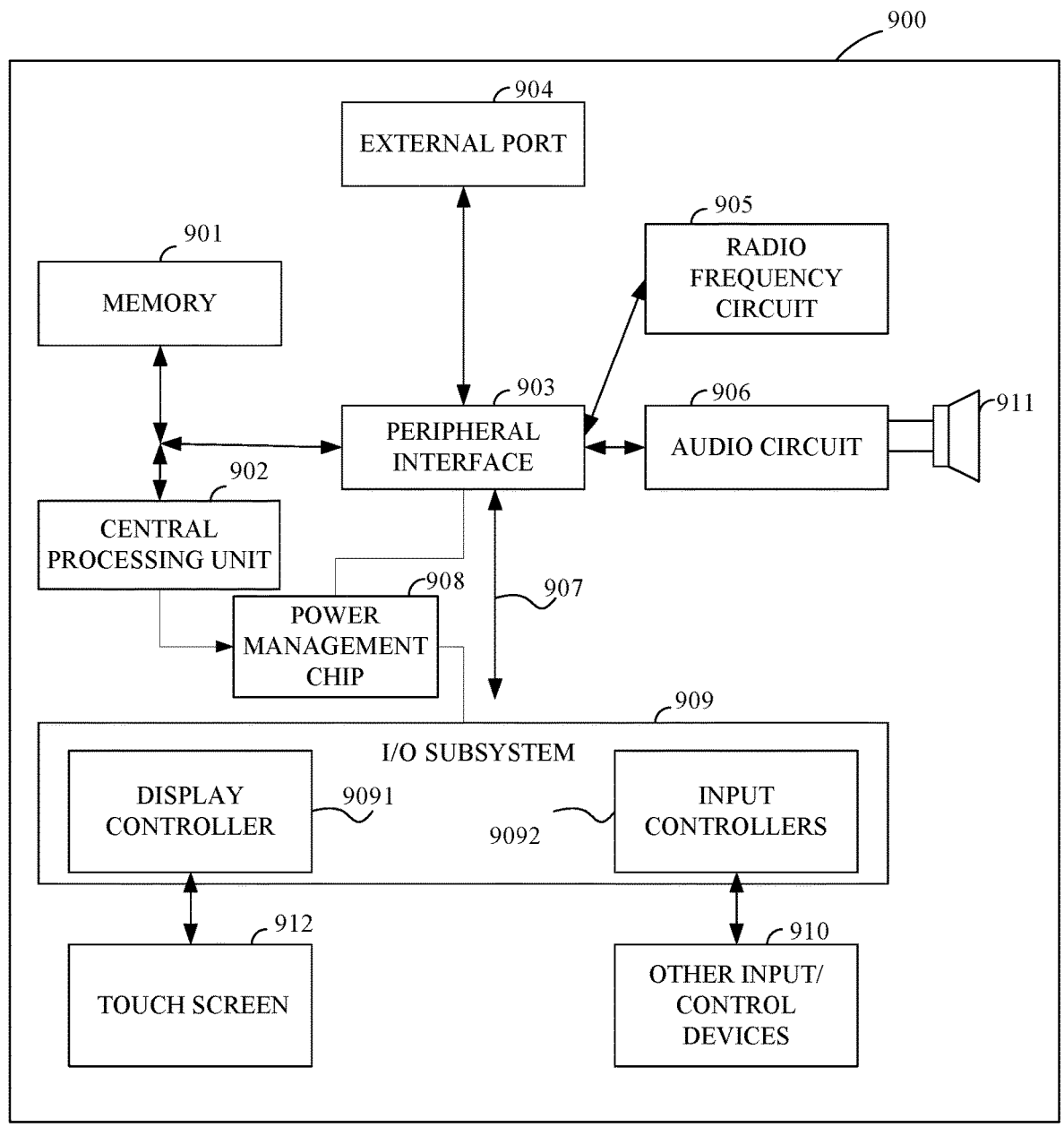
FIG. 9 is a block diagram illustrating a terminal according to another embodiment of the present disclosure.

FIG. 9 is a schematic structural diagram illustrating another terminal according to an implementation of the disclosure. The terminal includes a housing (not illustrated), a memory 901, and a central processing unit (CPU) 902 (also referred to as a processor, hereinafter CPU for short), a circuit board (not illustrated), and a power supply circuit (not illustrated). The circuit board is disposed inside a space defined by the housing. The CPU 902 and the memory 901 are disposed on the circuit board. The power supply circuit is configured to supply power to each circuit or component of the terminal. The memory 901 is configured to store executable program codes. The CPU 902 is configured to run a computer program corresponding to the executable program codes by reading the executable program codes stored in the memory 901 to carry out the following operations.

An application to be preloaded is determined in response to an event of application preloading being triggered. Resources for launching the application to be preloaded are preloaded. In response to receiving an instruction indicative of launching a target application included in the application to be preloaded, the target application is launched based on latest network data and preloaded resources for launching the target application. Resources for launching the target application include network data of the target application dynamically updated on a network side.

The terminal further includes a peripheral interface 903, a radio frequency (RF) circuit 905, an audio circuit 906, a speaker 911, a power management chip 908, an input/output (I/O) subsystem 909, other input/control devices 910, a touch screen 912, other input/control devices 910, and an external port 904, which communicate with each other via one or more communication buses or signal lines 907.

It should be understood that, the terminal 900 illustrated is just exemplary and the terminal 900 can have more or fewer components than those illustrated in FIG. 9. For example, two or more components can be combined, or different component configurations can be adopted in the terminal. The various components illustrated in FIG. 9 can be implemented in hardware, software, or a combination thereof including one or more signal processing and/or application specific integrated circuits.

The following describes a mobile phone as an example of the terminal for preloading an application.

The memory 901 is accessible to the CPU 902, the peripheral interface 903, and so on. The memory 901 can include a high-speed random access memory and can further include a non-transitory memory such as one or more magnetic disk storage devices, flash memory devices, or other transitory solid-state memory devices.

The peripheral interface 903 is configured to connect the input and output peripherals of the device to the CPU 902 and the memory 901.

The I/O subsystem 909 is configured to connect the input and the output peripherals such as the touch screen 912 and other input/control devices 910 to the peripheral interface 903. The I/O subsystem 909 can include a display controller 9091 and one or more input controllers 9092 configured to control other input/control devices 910. The one or more input controllers 9092 are configured to receive electrical signals from or send electrical signals to other input/control devices 910, where other input/control devices 910 can include a physical button (a press button, a rocker button, etc.), a dial, a slide switch, a joystick, or a click wheel. It should be noted that the input controller 9092 can be coupled with any of a keyboard, an infrared port, a universal serial bus (USB) interface, and a pointing apparatus such as a mouse.

The touch screen 912 functions as an input interface and an output interface between a terminal and a user, and is configured to display a visual output to the user. The visual output can include graphics, text, icons, videos, and the like.

The display controller 9091 in the I/O subsystem 909 is configured to receive an electrical signal from or send an electrical signal to the touch screen 912. The touch screen 912 is configured to detect contact on the touch screen. The display controller 9091 is configured to convert the contact detected into an interaction with a user interface object displayed on the touch screen 912, that is, to realize human-computer interaction. The user interface object displayed on the touch screen 912 can be an icon of a running game, an icon indicating connection to corresponding networks, and the like. It should be noted that, the device can also include a light mouse, which is a touch-sensitive surface that does not display a visual output, or can be an extension of a touch-sensitive surface formed by the touch screen.

The RF circuit 905 is configured to establish communication between a mobile phone and a wireless network (i.e. network side), to transmit and receive data between the mobile phone and the wireless network, such as transmitting and receive short messages, emails, and the like. The RF circuit 905 is configured to receive and transmit RF signals (also known as electromagnetic signals), to convert an electrical signal into an electromagnetic signal or convert an electromagnetic signal into an electrical signal, and to communicate with a communication network and other devices through electromagnetic signals. The RF circuit 905 can include known circuits for performing these functions, including but not limited to an antenna system, an RF transceiver, one or more amplifiers, a tuner, one or more oscillators, a digital signal processor, a coder-decoder (CO-DEC) chipset, a subscriber identity module (SIM), and so on.

The audio circuit 906 is configured to receive audio data from the peripheral interface 903, to convert the audio data into an electrical signal, and to transmit the electrical signal to the speaker 911.

The speaker 911 is configured to restore the voice signal received by the mobile phone from the wireless network via the RF circuit 905 to sound and to play the sound to the user.

The power management chip 908 is configured for power supply and power management of the hardware connected to the CPU 902, the I/O subsystem 909, and the peripheral interfaces 903.

The apparatus for launching an application, the storage medium, and the terminal of the above embodiments can execute the method for launching an application of any of the above embodiments and have corresponding functional modules and advantages of executing the method. For technical details not described herein, reference can be made to the description of the method for launching an application.

The above are only some embodiments of the present disclosure and the technical principles applied thereto. Those skilled in the art will appreciate that the present disclosure is not limited to the embodiments described herein, and that various changes, modifications, and substitutions can be made by those skilled in the art without departing from the scope of the disclosure. Therefore, while the disclosure has been described in connection with certain embodiments, it is to be understood that the disclosure is not to be limited to the disclosed embodiments but, on the contrary, is intended to cover various equivalent arrangements included within the scope of the disclosure. The scope of the disclosure is determined by the scope of the appended claims.

What is claimed is:

1. A method for launching an application, comprising:
    determining, in response to an application preloading event being triggered, an application to be preloaded;
    preloading resources for launching the application to be preloaded, the application to be preloaded comprising a target application, the resources comprising a first resource for launching the target application, and the first resource comprising network data of the target application, which is dynamically updated on a network side, wherein in the process of preloading the resources for launching the application to be preloaded, a notification for forging a focus is sent to the application to be preloaded, and continuous drawing and updated display of the application interface of the application to be preloaded are maintained during a preset time period based on the notification for forging a focus, the forged focus being independent from a focus of the foreground application; and
    launching, in response to receiving an instruction indicative of launching the target application, the target application based on latest network data of the target application and the first resource preloaded.

2. The method of claim 1, wherein determining, in response to the application preloading event being triggered, the application to be preloaded comprises:
    determining, in response to the application preloading event being triggered, the application to be preloaded based on launching probabilities of applications.

3. The method of claim 1, further comprising:
    acquiring the latest network data of the target application.

4. The method of claim 1, wherein launching, in response to receiving the instruction indicative of launching the target application, the target application based on the latest network data of the target application and the first resource preloaded comprises:
    acquiring the latest network data of the target application;
    updating the first resource preloaded based on the latest network data of the target application; and
    launching, in response to receiving the instruction indicative of launching the target application, the target application based on the updated first resource preloaded.

5. The method of claim 1, wherein the application to be preloaded comprises an application of a predetermined type, the target application belongs to the application of the predetermined type, the resources comprise a second resource for launching the application of the predetermined type, the second resource comprises network data of the application of the predetermined type, which is dynamically updated on the network side, the second resource comprises the first resource, and launching, in response to receiving the instruction indicative of launching the target application, the target application based on the latest network data of the target application and the first resource preloaded comprises:
    acquiring latest network data of the application of the predetermined type;
    updating the second resource preloaded based on the latest network data of the application of the predetermined type; and
    launching, in response to receiving the instruction indicative of launching the target application, the target application based on the updated first resource preloaded.

6. The method of claim 5, wherein acquiring the latest network data of the application of the predetermined type comprises:
    acquiring latest network data of the application of the predetermined type every preset time period.

7. The method of claim 1, wherein receiving the instruction indicative of launching the target application comprises one of:
    detecting an invoking instruction indicative of invoking the target application included in the application to be preloaded by another application; and
    determining receiving the instruction indicative of launching the target application by receiving a press on a desktop icon of the target application included in the application to be preloaded.

8. The method of claim 1, further comprising:
    preloading an application interface of the target application based on a pre-established active-window stack for preloading, boundary coordinates of the active-window stack for preloading being out of a coordinate range of a display screen.

9. The method of claim 8, wherein preloading the application interface of the target application comprises:
    establishing a target process corresponding to the target application;
    establishing a task stack corresponding to the target application in the pre-established active-window stack for preloading;
    launching an active-window corresponding to the target application in the task stack based on the target process; and drawing and displaying the application interface of the target application based on the active-window launched.

10. The method of claim 9, further comprising:
migrating the application interface of the target application in the pre-established active-window stack for preloading to the display screen for display.

11. A non-transitory computer-readable storage medium storing a computer program which, when executed by a processor, causes the processor to carry out actions, comprising:
determining, in response to an event of application preloading being triggered, an application to be preloaded;
preloading resources for launching the application to be preloaded, the application to be preloaded comprising a target application, the resources comprising a first resource for launching the target application, and the first resource comprising network data of the target application, which is dynamically updated on a network side, wherein in the process of preloading the resources for launching the application to be preloaded, a notification for forging a focus is sent to the application to be preloaded, and continuous drawing and updated display of the application interface of the application to be preloaded are maintained during a preset time period based on the notification for forging a focus, the forged focus being independent from a focus of the foreground application; and
launching, in response to receiving an instruction indicative of launching the target application, the target application based on latest network data of the target application and the first resource preloaded.

12. The non-transitory computer-readable storage medium of claim 11, wherein the computer program executed by the processor to carry out the action of launching, in response to receiving the instruction indicative of launching the target application, the target application based on latest network data of the target application and the first resource preloaded is executed by the processor to carry out actions, comprising:
acquiring the latest network data of the target application;
updating the first resource preloaded based on the latest network data of the target application; and
launching, in response to receiving the instruction indicative of launching the target application, the target application based on the updated first resource preloaded.

13. The non-transitory computer-readable storage medium of claim 11, wherein the application to be preloaded comprises an application of a predetermined type, the target application belongs to the application of the predetermined type, the resources comprise a second resource for launching the application of the predetermined type, the second resource comprises network data of the application of the predetermined type, which is dynamically updated on the network side, the second resource comprises the first resource, the computer program executed by the processor to carry out the action of launching, in response to receiving the instruction indicative of launching the target application, the target application based on latest network data of the target application and the first resource preloaded is executed by the processor to carry out actions, comprising:
acquiring latest network data of the application of the predetermined type;
updating the second resource preloaded based on the latest network data of the application of the predetermined type; and
launching, in response to receiving the instruction indicative of launching the target application, the target application based on the updated first resource preloaded.

14. The non-transitory computer-readable storage medium of claim 11, wherein the computer program executed by the processor to carry out the action of receiving the instruction indicative of launching the target application is executed by the processor to carry out actions, comprising one of:
detecting an invoking instruction indicative of invoking the target application included in the application to be preloaded by another application; and
determining receiving the instruction indicative of launching the target application by receiving a press on a desktop icon of the target application included in the application to be preloaded.

15. The non-transitory computer-readable storage medium of claim 11, wherein the computer program is further executed by the processor to carry out actions, comprising:
preloading an application interface of the target application based on a pre-established active-window stack for preloading, boundary coordinates of the active-window stack for preloading being out a coordinate range of a display screen.

16. The non-transitory computer-readable storage medium of claim 15, wherein the computer program is further executed by the processor to carry out actions, comprising:
migrating the application interface of the target application in the pre-established active-window stack for preloading to the display screen for display.

17. A terminal, comprising:
at least one processor; and
a computer readable storage, coupled to the at least one processor and storing at least one computer executable instruction thereon which, when executed by the at least one processor, cause the at least one processor to carry out actions, comprising:
determining an application to be preloaded in response to an event of application preloading being triggered;
preloading resources for launching the application to be preloaded, the application to be preloaded comprising a target application, the resource comprising a first resource for launching the target application, and the first resource comprising network data of the target application, which is dynamically updated on a network side, wherein in the process of preloading the resources for launching the application to be preloaded, a notification for forging a focus is sent to the application to be preloaded, and continuous drawing and updated display of the application interface of the application to be preloaded are maintained during a preset time period based on the notification for forging a focus, the forged focus being independent from a focus of the foreground application; and
launching, in response to receiving an instruction indicative of launching the target application, the target application based on latest network data of the target application and the first resource preloaded.

18. The terminal of claim 17, wherein the at least one processor carrying out the action of launching, in response to receiving the instruction indicative of launching the target application, the target application based on the latest network data of the target application and the first resource preloaded is caused to carry out actions, comprising:

acquiring the latest network data of the target application;

updating the first resource preloaded based on the latest network data of the target application; and launching, in response to receiving the instruction indicative of launching the target application, the target application based on the updated first resource preloaded.

19. The terminal of claim 17, wherein the at least one processor is further caused to carry out actions, comprising:

preloading an application interface of the target application based on a pre-established active-window stack for preloading, boundary coordinates of the active-window stack for preloading being out a coordinate range of a display screen.

20. The terminal of claim 19, wherein the at least one processor is further caused to carry out actions, comprising:

migrating the application interface of the target application in the pre-established active-window stack for preloading to the display screen for display.

* * * * *